United States Patent [19]

Bryant et al.

[11] Patent Number: 5,586,223
[45] Date of Patent: Dec. 17, 1996

[54] HIGH SPEED SEGMENTED NEURAL NETWORK AND FABRICATION METHOD

[75] Inventors: Steven M. Bryant, Holley; Kenneth H. Loewenthal, Rochester, both of N.Y.

[73] Assignee: Eastman Kodak Company, Rochester, N.Y.

[21] Appl. No.: 389,550

[22] Filed: Feb. 15, 1995

Related U.S. Application Data

[63] Continuation of Ser. No. 967,987, Oct. 27, 1992, abandoned.

[51] Int. Cl.$^6$ .................................................. G06F 15/80
[52] U.S. Cl. .................................. 395/27; 395/24
[58] Field of Search .................. 395/27, 24, 21, 395/22

[56] References Cited

U.S. PATENT DOCUMENTS

| | | | |
|---|---|---|---|
| 3,308,441 | 3/1967 | Dusheck | 395/24 |
| 4,933,871 | 6/1990 | DeSieno | 395/23 |
| 4,941,122 | 7/1990 | Weideman | 395/11 |
| 4,970,819 | 11/1990 | Mayhak | 42/70.01 |
| 4,990,838 | 2/1991 | Kawato et al. | 318/568.1 |
| 4,994,982 | 2/1991 | Duranton et al. | 395/27 |
| 5,014,327 | 5/1991 | Potter et al. | 382/14 |
| 5,033,006 | 7/1991 | Ishizuka et al. | 395/23 |
| 5,052,043 | 9/1991 | Gaborski | 382/14 |
| 5,056,015 | 10/1991 | Baldwin et al. | 364/200 |
| 5,060,276 | 10/1991 | Morris et al. | 382/8 |
| 5,060,278 | 10/1991 | Fukumizu | 395/11 |
| 5,063,521 | 11/1991 | Peterson et al. | 395/27 |
| 5,067,164 | 11/1991 | Denker et al. | 395/22 |
| 5,083,285 | 1/1992 | Shima et al. | 395/24 |
| 5,093,899 | 3/1992 | Hiraiwa | 395/23 |
| 5,105,468 | 4/1992 | Guyon et al. | 395/22 |
| 5,109,425 | 4/1992 | Lawton | 382/1 |
| 5,155,801 | 10/1992 | Lincoln | 395/22 |
| 5,175,798 | 12/1992 | Taylor et al. | 395/20 |
| 5,214,747 | 5/1993 | Cok | 395/27 |
| 5,220,640 | 6/1993 | Frank | 395/27 |
| 5,226,092 | 7/1993 | Chen | 382/14 |
| 5,255,346 | 10/1993 | Wu et al. | 395/23 |
| 5,293,456 | 3/1994 | Guez et al. | 395/22 |
| 5,355,437 | 10/1994 | Takatori et al. | 395/24 |

FOREIGN PATENT DOCUMENTS

| | | | |
|---|---|---|---|
| 459276 | 12/1991 | European Pat. Off. | G06F 15/80 |
| 4-51375 | 2/1992 | Japan . | |

OTHER PUBLICATIONS

Guoquing et al, "Multilayer Parallel Distributed Pattern Recognition System Model Using Sparse RAM Nets", IEE Proc [Computers & Digital Techniques], vol. 139 Iss2 pp. 144–146, Mar. 1992.

Milligon et al, "RAM Unit Learning Networks", IEEE 1st Conf on Neural Networks, Jun. 21–24 1987, pp. II-557-II-565.

Ae et al, "A Memory Based Artificial Neural Network", 1991 Int'l Joint Conf on Neur Net, Nov. 18–21 1991, pp. 614–619 vol. 1.

(List continued on next page.)

*Primary Examiner*—Robert W. Downs
*Attorney, Agent, or Firm*—Charles E. Snee, III; Clyde E. Bailey, Sr.

[57] ABSTRACT

A high speed, feed forward, segmented neural network and fabrication technique are described. The segmented network includes a plurality of network layers stacked in an ascending pyramid fashion. The network layers are structured with a plurality of subnetworks, and within each subnetwork exists a plurality of nodes structured in a fully interconnected and/or partially interconnected layered neural network arrangement. The inputs and outputs of each subnetwork are one bit digital values constrained to '0' or '1', while any number of nodes with any number of layers may be modeled for each subnetwork. Each subnetwork is independent of all other subnetworks in a given network layer, and thus, each network layer is segmented. In hardware implementation, each subnetwork comprises a simple memory device, such as a RAM or PROM look-up table. The speed of the neural network system is high and largely dictated by the access time of the memory devices used.

9 Claims, 4 Drawing Sheets

OTHER PUBLICATIONS

Hansen et al, "Ensemble Methods for Handwritten Digit Recognition", Neural Net for Signal Processing II, Aug. 31–Sep. 2, 1992, pp. 333–342.

*New Electronics, Incorporating Electronic Today,* Jan. 1989, pp. 16–18, "Ram Chips Build Simple Quick Thinking Networks", Boothroyd.

*IEEE Proceedings E. Computers & Digital Techniques,* vol. 139, No. 2, Mar. 1992, pp. 144–146, "Multilayer Parallel Distributed Pattern Recognition System Model Using Sparse RAM Nets".

*Proceedings of the Annual International Conference of the IEEE Engineering in Medicine and Biology Society,* vol. 11, No. 6, 9 Nov. 1989, pp. 2038–2039, "Decomposing Neural Networks into Systems of Cooperating Subnets."

D. H. Ballard, "Modular Learning in Neural Networks," Proceedings AAAI-87, vol. 1, pp. 279–284 Jul. 1987.

HIGH SPEED SEGMENTED NEURAL NETWORK AND FABRICATION METHOD

This application continuation of application Ser. No. 07/967,987, filed Oct. 27, 1992, now abandoned.

BACKGROUND OF THE INVENTION

1. Technical Field

The invention relates in general to the field of computer processing systems and, in particular, to high speed neural network systems and fabrication techniques thereof.

2. Background Ark

Artificial neural networks are massively parallel neuron-type elements that are interconnected in a specific manner to provide, but not limited to, optical character recognition, pattern recognition, machine learning, process control and voice recognition. The most common structures in artificial neural network systems are networks of non-linear processing elements, where "nodes" are interconnected to a plurality of inputs through information processing channels or "weights." Each node can process multiple inputs and weights, and each node has one output signal. The networks can often have multiple layers, wherein layers subsequent to the first layer receive inputs from the outputs of the previous layer. The last layer in the network generally provides the output stimulus.

Neural networks can simulate, on a very basic level, the features of biological nervous systems. Many of the advantages of biological nervous systems include: the ability to generalize, adapt and deal with a wide degree of latitude in environments, operate in a massively parallel form to effectively function at real time rates, fault tolerance or the ability to deal with errors internal to the network and the ability to learn by example. Neural networks do require training before useful results can be obtained. However, in many applications, one time batch back-propagation training of a neural network is sufficient. Once trained, the resultant "weights" are stored and retrieved for later use in a non-training, testing mode or "forward mode" operation.

In most highly interconnected networks the number of weights increases rapidly in a non-linear fashion as the number of nodes and inputs increase linearly. For example, if the number of nodes increases linearly with the number of inputs within a single layer of a fully interconnected network, then the number of weights increase as the square of the number of inputs. More specifically, in a small network layer of say 10 inputs and 10 nodes which are fully interconnected, 100 weights would be employed. However, for 1000 inputs and 1000 nodes, the number of necessary weights would be prohibitively high at 1,000,000. This would not only require massive amounts of hardware to simulate but could be very complex and slow in the forward mode when emulated on a single processor system.

Tantamount to real time network operation in the forward mode (for example, in a pattern recognition system using a neural network) is the use of a very fast simplified hardware. This is often difficult to achieve since many pattern recognition applications require a large number of inputs and/or nodes. Many previously developed pattern recognition systems do not use a simplified and fast hardware system. Further, in the case of an extremely large number of inputs, a true parallel hardware manifestation of a network is virtually impossible. In many real time pattern recognition applications, speeds in excess of many billion interconnects per second are required for the neural network. However, a neural network that operates at these effective speeds is not currently available. In addition, many previously developed pattern recognition neural network systems have structures which do not lend themselves well to high speed pattern recognition in hardware implementation.

Thus, a need exists in the art for a neural network system which lends itself to implementation with a large number of inputs and nodes and which does not require an enormous number of weights and physical interconnections. In addition, the topology of the network must be such that not only can it be manifested in a realizable and finite amount of hardware, but it must also be capable of operation at very high speeds. The neural network system disclosed herein satisfies these requirements.

SUMMARY OF THE INVENTION

Briefly summarized, in a first broad aspect, the present invention provides a feed forward, segmented neural network having multiple network layers and a plurality of subnetworks. Each subnetwork resides within one of the multiple network layers and at least one of the network layers contains multiple subnetworks. All subnetworks within a network layer having multiple subnetworks are isolated or segmented from the other subnetworks in the network layer. The multiple network layers are arranged in pyramidal fashion from an input network layer to an output network layer such that the number of subnetworks in the network layers decreases from the input network layer to the output network layer. In a hardware implementation, the subnetworks comprise memory devices. Further enhancements of the novel segmented neural network are also described.

In another aspect, a method for fabricating a high speed, feed forward, segmented neural network is set forth. The method includes the steps of: selecting a subnetwork model and a segmented neural network model employing the selected subnetwork model (such that the segmented neural network model has multiple network layers within which multiple subnetworks are disposed); training the selected segmented neural network while imposing a limitation that values passing from a network layer to an adjacent network layer comprise binary signals; mapping input and output values of each subnetwork in the segmented neural network model; and programming mapped subnetwork inputs/outputs into a memory device.

The neural network design presented herein allows processing speeds which are unmatched in todays neural network state-of-the-art technology, while at the same time maintaining simplicity of design. This is achieved by not fully interconnecting the network, termed herein "segmentation" of the network. In addition, by not fully interconnecting the network, the design can be scaled up to large input neural networks which would be virtually impossible to implement in hardware as a fully connected neural network. The speed of the neural network is dependent only on the number of network layers and the speed of the memory devices employed.

BRIEF DESCRIPTION OF THE DRAWINGS

These and other objects, advantages and features of the present invention will be more readily understood from the following detailed description of certain preferred embodiments thereof, when considered in conjunction with the accompanying drawings in which.

DESCRIPTION OF THE PREFERRED EMBODIMENTS

Figure 1:
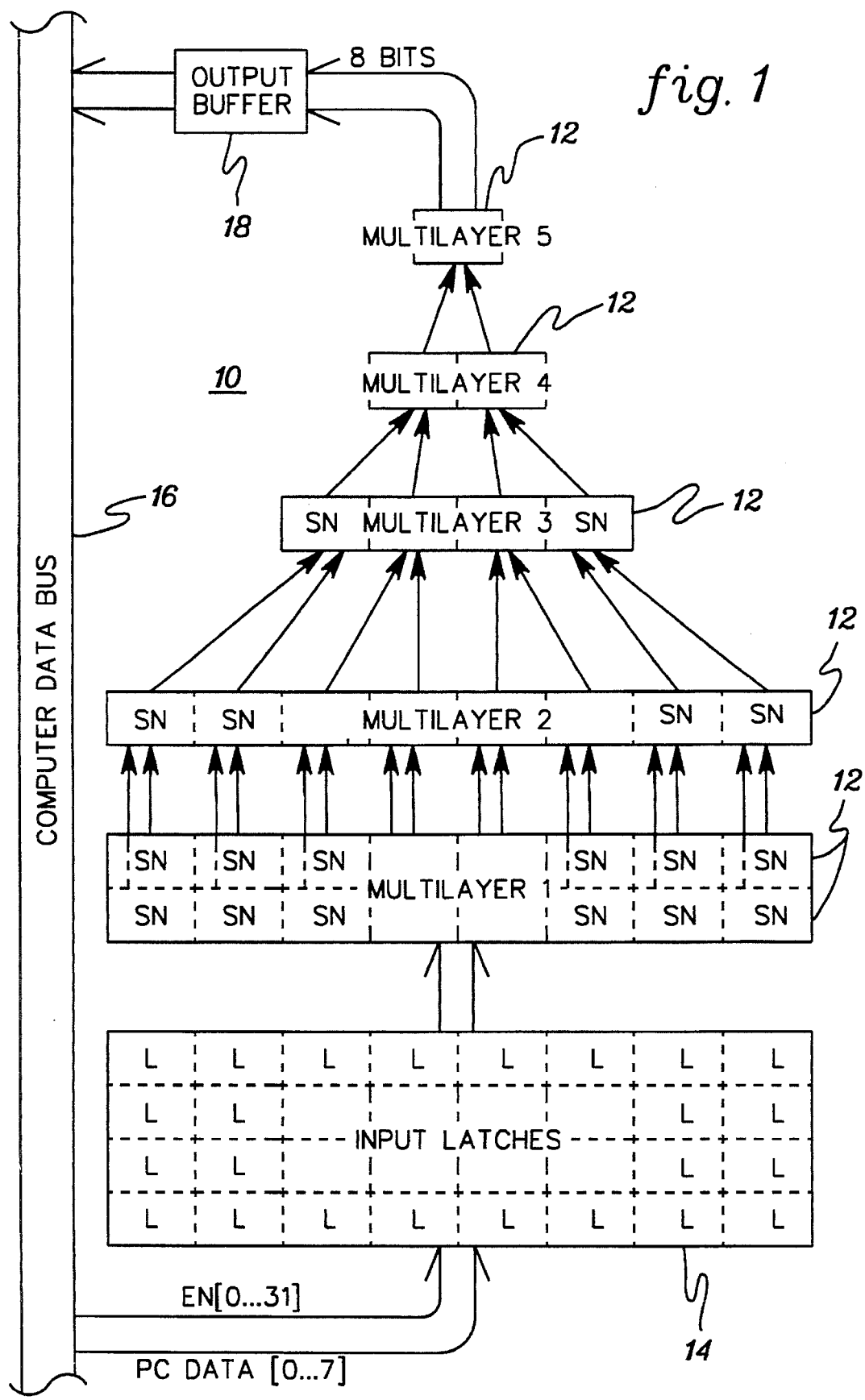
FIG. 1 is a representation of one embodiment of a segmented neural network pursuant to the present invention.

In accordance with the present invention, a neural network system is provided which lends itself in implementation to a realizable amount of hardware and which is capable of high speed pattern recognition, with a large number of inputs and nodes. system is referred to herein as a "segmented" neural network system and includes a plurality of network layers stacked in an ascending pyramid fashion. The network layers are structured with a plurality of "subnetworks". Within each subnetwork exists a plurality of nodes structured in a fully interconnected and/or partially interconnected layered arrangement. Each subnetwork contains a plurality of inputs and, in the embodiment described below, has one half the number of outputs compared to inputs. The inputs and outputs of the subnetwork are one bit digital values constrained to 0 and 1. Any number of nodes with any number of layers may be modeled within each subnetwork. Further, the number of subnetwork outputs could be other than one half the number of inputs.

The first network layer is the input network layer. The last network layer is the output network layer. All other network layers in between are hidden network layers. Each network layer can be modeled with any number of subnetworks, wherein each subnetwork is independent of all other subnetworks in the subject network layer. In this way, each network layer is segmented.

For N inputs per subnetwork and M subnetworks in a given network layer, the network layer has NxM inputs and, in the preferred embodiment described herein, (N×M)/2 outputs. The outputs from each network layer go to the inputs of the next network layer such that the outputs from preselected subnetworks in the previous network layer connect to one subnetwork in the next layer. The size of each subsequent network layer is dictated by its lower network layer, i.e., the number of inputs needed for next network layer in the pyramid. The number of inputs, subnetworks, and outputs in each subsequent network layer is reduced from (e.g., one half) the previous layer. Network layers are stacked onto previous network layers until (for example) only one subnetwork is left in the top most network layer. In this way a pyramidal, segmented neural network is created.

By creating subnetworks with finite and technologically feasible numbers of inputs and outputs, the subnetworks can be replaced by simple memory devices such as RAM or PROM look-up tables. After the network has been trained on a computer simulation, the input and output values of each subnetwork can be mapped and stored into a memory device. Then each subnetwork can be replaced with its corresponding memory device. Once the subnetworks are replaced with hardware memory devices they can be used to accurately emulate the neural network in forward mode. The speed of the system will be high and largely dictated by the access time of the memory devices used, and the number of network layers in the structure. In addition, the number of physical interconnections will be relatively low.

A more detailed implementation of the invention is next described with reference to the drawings wherein the same reference numbers are used through different figures to designate the same or similar components.

One embodiment of a neural network system, generally denoted 10, pursuant to the present invention is depicted in FIG. 1. Neural network system 10 is a pyramidal, segmented neural network five network layers labeled "multilayer 1" (i.e., the input layer), "multilayer 2", "multilayer, 3", "multilayer 4" and "multilayer 5" (i.e., the output layer) With the exception of "multilayer 5" each layer of neural network 10 contains multiple subnetworks "SN"12, with each "subnetwork" assumed to consist of 16 inputs and 8 outputs. Each subnetwork comprises a memory device such as a PROM, with the number of outputs from each subnetwork being one half the number of inputs. For example, the outputs from two paired subnetworks in "multilayer 1" feed the same subnetwork in "multilayer 2", while the outputs from two paired subnetworks in "multilayer 2" feed the same subnetwork in "multilayer 3", the outputs from two paired subnetworks in "multilayer 3" feed the same subnetwork input in "multilayer 4", and the outputs from the two subnetworks 12 in "multilayer 4" are fed as input to the single subnetwork comprising "multilayer 5". (As described below, in system 10 the pairing of subnetwork 12 outputs is predefined.)

Network 10 is used in forward mode only, with training taking place on a separate computer, and the results of that training being programmed into the subnetworks, or more particularly, the memory devices employed. Thus, in implementation the structure of the overall network is one consisting of multiple subnetworks, with each subnetwork, for example, consisting of 16 inputs and 8 outputs. The 8 outputs from each of the first layer subnetworks are combined 16 bits at a time as inputs to the second layer subnetworks. This structure is continued to the final layer where the 8 outputs comprise the results of the overall network.

Neural network system 10 is resident within a computer processing system, such as a pattern recognition system, and receives input information to "multilayer 1" by way of a plurality of input latches 14 which are coupled to receive data directly from the computer data bus 16. By way of example, 32 8-bit input latches (type 74ALS273) may be employed in a 256 input neural network. Information from prepaired latches is asynchronously fed to a corresponding subnetwork in "multilayer 1". Input latches 14 are synchronously loaded via the common data bus by activating the appropriate enable line EN[0 . . . 31]. Each subnetwork in the pyramidal neural network structure may be implemented as an AM27512 64k PROM which, again, has 16 inputs and 8 outputs. Output from the neural network (i.e., from "multilayer 5") is buffered in an output buffer 18 for ultimate placement onto computer data bus 16. Buffer 18 may comprise integrated circuit type 74 ALS244.

Figure 2:
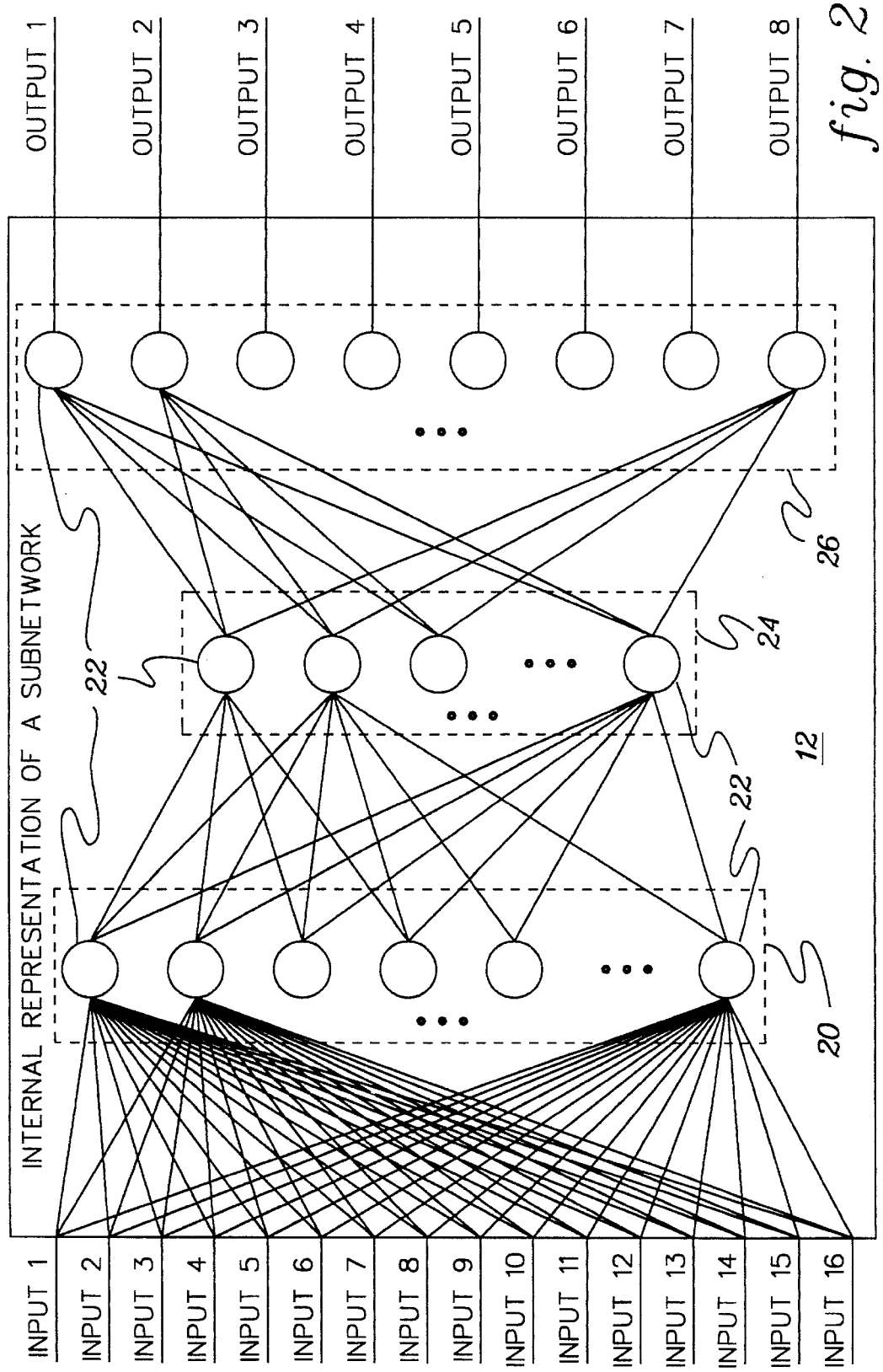
FIG. 2 is an internal representation of one embodiment of a subnetwork pursuant to the present invention for use in the segmented neural network of FIG. 1.
Figure 3:
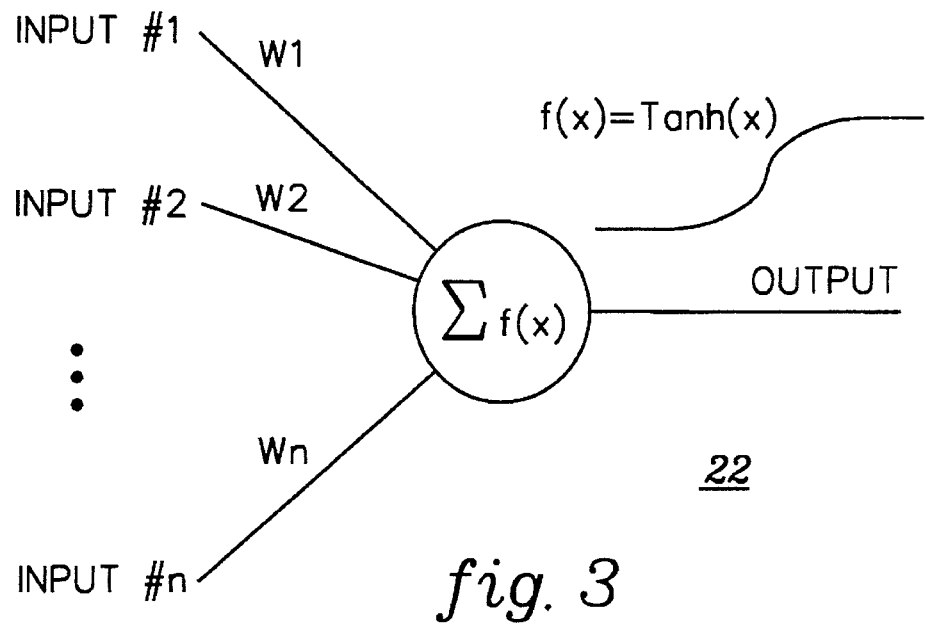
FIG. 3 is a representation of an individual node in the subnetwork of FIG. 2.

By way of further example, one embodiment of subnetwork 12 pursuant to the present invention is shown in FIG. 2. In this embodiment, three nodal layers are depicted. An input nodal layer 20 comprises a plurality of nodes 22, each of which receives the 16 inputs to subnetwork 12. Output from input nodal layer 20 is provided to an intermediate nodal layer 24, the output of which is input to output nodal layer 26. The output from nodal layer 26 comprises the output of subnetwork 12. This embodiment of a subnetwork comprises a fully interconnected subnetwork since each node in each layer receives the same inputs and each node outputs to each node in the subsequent nodal layer. As depicted in FIG. 3, each internal node 22 comprises a non-linear summing agent. The node sums its inputs (x) multiplied by their respective weights (w1, w2... wn) and then applies the sum to the non-linear transformation. The non-linear transformation has the characteristic of being bounded asymptotically in both the negative and positive infinity directions, and also has the characteristic of being monotonically increasing. There are several common functions which have this characteristic, one of which is the Tanh(x) function. Those skilled in the art will recognize that other functions may also meet these characteristics.

Figure 4:
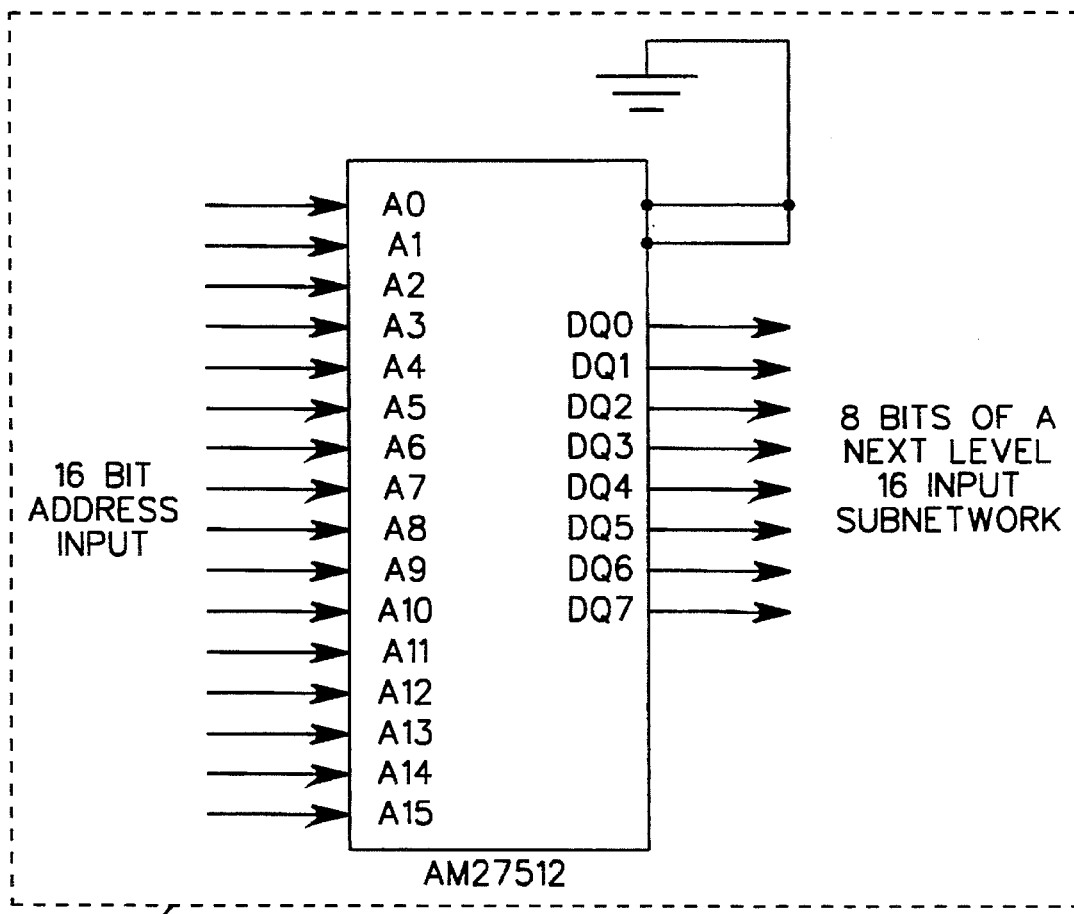
FIG. 4 is an example of a PROM subnetwork implementation pursuant to the present invention for the neural network of FIG. 1.

As noted initially with respect to FIG. 1, the network is made up of layers of memory devices wherein each memory device has 16 inputs and 8 outputs. By way of example, FIG. 4 depicts pin connections for an AM27512 type PROM device. Again, other memory devices could be employed. Each memory device is thought of as a subnetwork which (in the embodiment described herein) as 16 inputs and 8 output nodes as shown in FIG. 2.

Figure 5:
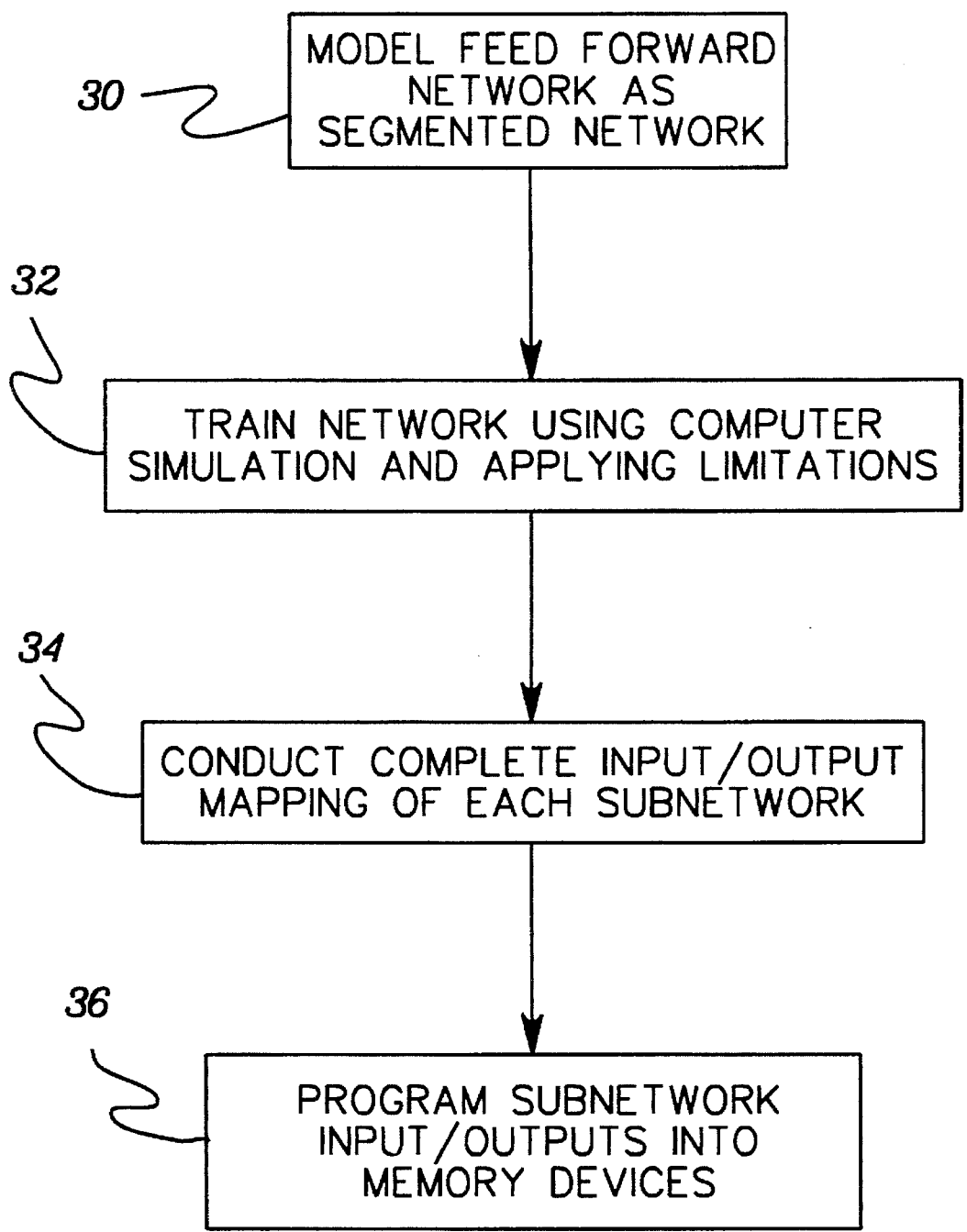
FIG. 5 is a flowchart of a neural network fabrication technique pursuant to the present invention.

Fabrication of a neural network pursuant to the present invention is next described with reference to FIG. 5. During training of the network, the network is modeled as a segmented network where the inputs are taken, for example, 16 at a time and presented to the corresponding individual subnetworks, 30 "Model Feed Forward Network As Segmented Network." The subnetworks are modeled as 16 input fully interconnected multilayer networks with 8 output nodes. Any commercially available computer simulation technique may be used to train the network, however, certain limitations are applied, 32 "Train Network Using Computer Simulation and Applying Limitations." Specifically, training is conducted such that the values which are passed from one network layer to the next are binary, i.e., "0" or "1". Within the subnetwork this condition does not apply and during training the internal states of the subnetwork are allowed to take on continuous real values.

Once network training is completed, a complete input/output mapping is done on each subnetwork, 34 "Conduct Complete Input/Output Mapping for Each Subnetwork." With a complete input/output mapping of the subnetwork, internal states are no longer needed and the input/output relationship can be programmed directly into the selected memory device, 36 "Program the Input/Output Relationships Into Memory Devices."

For the network presented herein, there are 256 binary inputs (see FIG. 1). The binary inputs are latched one byte at a time from a computer interface. These 256 inputs are then presented to the 16 input layer subnetwork memory devices, labeled "multilayer 1" in FIG. 1. Each 16 input subnetwork memory devices generates 8 outputs to be presented to the next network layer. The outputs are presented asynchronously as inputs to the next network layer. Thus, each subsequent network layer contains one half the number of memory devices as the previous layer, so that the second layer, labeled "multilayer 2" in FIG. 1, must have 8 memory devices and so on until the last layer of the pyramidal structure, i.e., "multilayer 5", has one memory device. The output layer has 8 outputs which allows the network to make up to 256 decisions or class distinctions.

Once all 256 inputs are latched into the input of the network, the output of the network is delayed only by the propagation delay of the memory devices from one layer to the next. For example, for the memory device depicted in FIG. 4, the input/output delay is 30 nanoseconds. Thus, for 5 layers, the entire network input/output delay is approximately 150 nanoseconds.

Since each subnetwork can reasonably be thought of as a 16 input, 3 layer, 8 output, fully interconnected network with 11 hidden layer nodes, each subnetwork model contains 264 interconnects. The overall network consists of 31 subnetworks so that the interconnections between subnetworks add up to 240. The total number of equivalent interconnects is thus 31×264+240=8,184. This corresponds to an amazing 54 billion interconnects per second, which is at least an order of magnitude greater than speeds attainable by any pre-existing neural network structure.

To summarize, the neural network design presented herein allows speeds which are unmatched by today's neural network state-of-the-art technology, while at the same time maintaining simplicity of board design. This is achieved by not fully interconnecting the network, termed herein "segmentation" of the network. In addition, by not fully interconnecting the network, the design can be scaled up to large input neural networks which would be virtually impossible to implement in hardware as a fully connected neural network. The speed of the neural network is limited only by the number of network layers modeled and the speed of the memory devices employed.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

We claim:

1. A method for emulating a feed forward, segmented neural network having a large number of inputs, said method comprising the steps of:

(a) modeling a segmented neural network having a large number of inputs as multiple network layers of subnetworks segmented such that each subnetwork within a network layer receives totally different inputs than all other subnetworks within said network layer, a plurality of said multiple network layers each having an even number of segmented subnetworks, each subnetwork comprising a plurality of interconnected sublayers, each sublayer having a plurality of processing nodes, and each subnetwork being sized for realization as a single binary memory device;

(b) training the segmented neural network modeled in step (a) while requiring that input and output values of each network layer comprise binary signals;

(c) mapping all possible input and corresponding output values of each subnetwork of said trained segmented neural network;

(d) storing the mapped input and output values of each subnetwork in an associated binary memory device such that behavior of each subnetwork of the trained segmented neural network is emulated completely by the associated binary memory device; and (e) electrically interconnecting associated binary memory devices in a circuit arrangement corresponding to connection of the subnetworks in the modeled segmented neural network.

2. The method of claim 1, wherein said training step includes training the segmented neural network using a computer simulation.

3. The method of claim 1, wherein the modeling step comprises modeling the segmented neural network to contain multiple network layers arranged in pyramidal fashion from an input network layer to an output network layer such that the number of subnetworks in said multiple network layers decreases from said input network layer to said output network layer.

4. A method for emulating a feed forward, segmented neural network having a large number of inputs, said method comprising the steps of:

(a) modeling a segmented neural network having a large number of inputs as multiple network layers of subnetworks segmented such that each subnetwork within a network layer receives totally different inputs than all other subnetworks within said network layer, each subnetwork comprising a plurality of interconnected sublayers, each sublayer having a plurality of processing nodes, and each subnetwork being sized for realization as a single binary memory device, said modeling step including modeling the segmented neural network to have a plurality of network layers each having an even number of segmented subnetworks, said modeling step further comprising modeling the segmented neural network such that the total number of inputs, the total number of subnetworks, and the total number of outputs of each network layer is one half of the total number of inputs, the total number of subnetworks and the total number of outputs, respectively, of an immediately preceding network layer;

(b) training the segmented neural network modeled in step (a) while requiring that input and output values of each network layer comprise binary signal;

(c) mapping all possible input and corresponding output values of each subnetwork of said trained segmented neural network;

(d) storing the mapped input and output values of each subnetwork in an associated binary memory device such that behavior of each subnetwork of the trained segmented neural network is emulated completely by the associated binary memory device; and (e) electrically interconnecting associated binary memory devices in a circuit arrangement corresponding to connection of the subnetworks in the modeled segmented neural network.

5. Apparatus for emulating a trained feed forward, segmented neural network having a large number of inputs and multiple network layers of subnetworks, each layer comprising at least one subnetwork, each subnetwork comprising a plurality of processing nodes in an interconnected sublayered arrangement, each subnetwork of each network layer receiving totally different inputs than all other subnetworks of said layer, and each subnetwork being sized for realization as a single binary memory device, said multiple network layers being arranged in pyramidal fashion from an input network layer to an output network layer such that the number of subnetworks in said multiple network layers decreases from said input network layer to said output network layer, said apparatus comprising:

a plurality of binary memory devices equal in number to the number of said subnetworks of the trained segmented neural network, each binary memory device being associated with a respective subnetwork and storing a complete set of mapped input and output values of the subnetwork such that behavior of the subnetwork within the trained segmented neural network is completely emulated by the associated binary memory device, wherein each of said binary memory devices has M inputs and N outputs, wherein $N=M/2$, and M and N are integers greater than 0; and means for electrically interconnecting the plurality of binary memory devices in a circuit arrangement which corresponds to said segmented neural network.

6. The apparatus of claim 5 wherein each of said binary memory devices has 16 inputs and 8 outputs.

7. The apparatus of claim 5 wherein each of said binary memory devices comprises a Programmable Read Only Memory device.

8. The apparatus of claim 5 wherein each of said binary memory devices comprises a Random Access Memory device.

9. The apparatus of claim 5 further comprising a bank of latches for providing inputs to said circuit arrangement, and an output buffer for receiving outputs of said circuit arrangement.

* * * * *